(12) United States Patent
Oda et al.

(10) Patent No.: US 12,478,054 B2
(45) Date of Patent: Nov. 25, 2025

(54) FISHING CONDITION MANAGEMENT DEVICE, FISHING ROD PROVIDED WITH SAME, AND FISHING CONDITION MANAGEMENT SYSTEM

(71) Applicant: GLOBERIDE, Inc., Tokyo (JP)

(72) Inventors: Takuya Oda, Tokyo (JP); Yukihisa Miya, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 18/267,382

(22) PCT Filed: Oct. 26, 2021

(86) PCT No.: PCT/JP2021/039422
§ 371 (c)(1),
(2) Date: Jun. 14, 2023

(87) PCT Pub. No.: WO2022/137782
PCT Pub. Date: Jun. 30, 2022

(65) Prior Publication Data
US 2024/0041015 A1    Feb. 8, 2024

(30) Foreign Application Priority Data
Dec. 22, 2020   (JP) ................................. 2020-212836

(51) Int. Cl.
*A01K 97/12* (2006.01)
*A01K 87/00* (2006.01)

(52) U.S. Cl.
CPC ............ *A01K 97/125* (2013.01); *A01K 87/00* (2013.01)

(58) Field of Classification Search
CPC ....... A01K 97/125; A01K 97/12; A01K 97/00
(Continued)

(56) References Cited

U.S. PATENT DOCUMENTS 4,235,036 A * 11/1980 Dawson ............... A01K 97/125
                                                     43/17
4,766,688 A *  8/1988 Hiles .................... A01K 97/125
                                                     43/17
(Continued)

FOREIGN PATENT DOCUMENTS

GB    2613998 A    6/2023
JP    S62-094780 U    6/1987
(Continued)

OTHER PUBLICATIONS

International Preliminary Report on Patentability for related International Application No. PCT/JP2021/039422; action dated Jun. 13, 2023; (12 pages).
(Continued)

*Primary Examiner* — William L Gmoser
(74) *Attorney, Agent, or Firm* — Oliff PLC

(57) ABSTRACT

A fishing state management device according to an embodiment of the present disclosure is a fishing state management device that comprises a grip portion and is provided on a fishing rod to which a fishing line having a fishing hook is attached at an end, and comprises: a vibration generation unit that is provided on the grip portion and generates vibration in the grip portion; a detection unit that is provided on the fishing rod and detects a fishing state comprising at least movement and vibration of the fishing rod to generate data regarding the fishing state; a recording unit that records the data regarding the fishing state; and a processing unit that transmits a vibration generation signal to the vibration generation unit based on the data regarding the fishing state.

11 Claims, 8 Drawing Sheets

(58) Field of Classification Search
USPC .................................................. 43/17, 4, 4.5
See application file for complete search history.

(56) References Cited

U.S. PATENT DOCUMENTS

| | | | | |
|---|---|---|---|---|
| 5,581,930 | A * | 12/1996 | Langer | A01K 97/00 43/17 |
| 5,782,033 | A * | 7/1998 | Park | A01K 97/125 43/17 |
| 5,833,156 | A * | 11/1998 | Park | A01K 89/01555 242/223 |
| 7,003,912 | B1 * | 2/2006 | Morgan | A01K 87/007 43/16 |
| 7,183,931 | B1 * | 2/2007 | Russell | A01K 97/125 340/573.2 |
| 7,562,488 | B1 * | 7/2009 | Perkins | A01K 87/007 43/4.5 |
| 9,420,774 | B1 * | 8/2016 | Antonio | A01K 97/125 |
| 9,609,856 | B1 * | 4/2017 | Little | A01K 87/00 |
| 10,874,094 | B1 * | 12/2020 | Kowalski | A01K 87/02 |
| 2002/0004422 | A1 | 1/2002 | Tosaki et al. | |
| 2003/0073492 | A1 | 4/2003 | Tosaki et al. | |
| 2003/0089020 | A1 * | 5/2003 | Dirito | A01K 97/125 43/17 |
| 2008/0000138 | A1 * | 1/2008 | Cummings | A01K 97/125 43/25 |
| 2016/0353725 | A1 * | 12/2016 | Worley, III | A01K 87/007 |
| 2018/0213761 | A1 * | 8/2018 | Carkner | G08B 5/22 |
| 2022/0301302 | A1 * | 9/2022 | Murphy | G05D 1/0044 |

FOREIGN PATENT DOCUMENTS

| | | |
|---|---|---|
| JP | H10214155 A | 8/1998 |
| JP | 2002233284 A | 8/2002 |
| JP | 2005034116 A | 2/2005 |
| JP | 2010246394 A | 11/2010 |
| JP | 2013192542 A | 9/2013 |
| JP | 2017029051 A | 2/2017 |
| JP | 2018183102 A | 11/2018 |
| KR | 10-2002-0072774 A | 9/2002 |
| WO | 2006070741 A1 | 7/2006 |

OTHER PUBLICATIONS

International Search Report for related International Application No. PCT/JP2021/039422; action dated Jun. 30, 2022; (5 pages).
Written Opinion for related International Application No. PCT/JP2021/039422; action dated Jun. 30, 2022; (5 pages).
Feb. 20, 2024 Office Action issued in Japanese Patent Application No. 2020-212836.
Apr. 29, 2024 Examination Report issued in Australian Patent Application No. 2021405471.
Nov. 14, 2024 Examination Report issued in Australian Application No. 2021405471.
Sep. 19, 2024 Examination Report issued in UK Application No. GB2306355.5.
Sep. 20, 2025 Office Action issued in Singaporean Patent Application No. 11202303204R.
Sep. 22, 2025 Office Action issued in Korean Patent Application No. 10-2023-7024691.

* cited by examiner

FISHING CONDITION MANAGEMENT DEVICE, FISHING ROD PROVIDED WITH SAME, AND FISHING CONDITION MANAGEMENT SYSTEM

CROSS-REFERENCE TO RELATED APPLICATIONS

The present application is a National Stage of International Application No. PCT/JP2021/039422 filed on Oct. 26, 2021 which claims priority to and the benefit of Japanese Patent Application No. 2020-212836 filed on Dec. 22, 2020, the contents of which are incorporated herein by reference in their entirety.

FIELD

The present disclosure relates to a device for recording and reproducing a fishing state, a fishing rod comprising the same, and a management system comprising the same.

BACKGROUND

Conventionally, a device capable of simulating a fishing rod and a device capable of detecting a nibble have been known. The device capable of simulating a fishing rod allows a predetermined experience of fishing by holding a fishing rod. Furthermore, in the device capable of detecting a nibble, vibration of a so-called fish bite is detected, and this is notified to a fishing person by using a notification means or an electronic device, for example, a luminous body or a buzzer.

An example of such a device capable of simulating a fishing rod is disclosed in Patent Literature 1. Patent Literature 1 relates to an input device used in a fishing game and the like, and particularly relates to an input device capable of simulating a fishing rod or the like without a mechanical constraint of a fishing line or the like and a processing technique of the same, and discloses an input device that is moved as a whole when an operator grips and operates a grip portion, the input device including a movement detecting means which detects movement of the input device.

Furthermore, as the device capable of detecting a nibble, Patent Literature 2 discloses a detection device of a nibble in which a support rod of a fishing line support ring is provided on a lower front side of an attachment body formed to located at a tip of a fishing rod; a pivot shaft portion having a support shaft extending in a horizontal direction is provided in the vicinity of a lower end of the support rod; the center portion of the fishing line support ring having a rotating contact on the upper portion is pivotably attached to the pivot shaft portion; a fixing contact is provided on a lower side of the front end of the attachment body; the fishing line support ring is inclined rearward all the time; when the fishing line passing through the fishing line support ring comes into contact with a lower half portion of the fishing line support ring, the fishing line support ring inclined rearward is rotated forward due to the contact to cause the rotating contact to come into contact with the fixing contact; and when the contact of the fishing line is released, the fishing line support ring is rotated to be inclined rearward such that the rotating contact is separated from the fixing contact, the detection device including a detection unit and a fishing line engaging portion, the detection unit being provided at a portion at which one electrode of the battery is connected to the rotating contact, the other electrode is connected to the fixing contact, and an electric alarm is inserted to the connecting line and the fishing line engaging portion being on the lower side near the tip of the fishing rod, being located on the rear side of the fishing line support ring, and engaging the fishing line.

CITATION LIST

Patent Literature

Patent Literature 1: JP H10-214155 A
Patent Literature 2: JP 2005-34116 A

SUMMARY

However, in a mode according to Patent Literature 1, the fishing rod at the time of a fish bite (nibble) can be simulated, but there are problems that the fish bite is merely a state in which a fish bites a bait and the fish is hooked on a fishing hook, and the fish bite does not simulate a state between casting of a fishing tackle and landing of the fish other than the fish bite, and the simulation of the fishing rod is performed merely in a game and is limited.

Furthermore, in a mode according to Patent Literature 2, it is possible to detect a fish bite, but it is difficult to know a state between casting of a fishing tackle and landing of the fish other than the fish bite, and thus, there is a problem that it is impossible to record or reproduce the state in the first place.

If states of a fish and the fishing line between the casting of the fishing tackle including reaching the bottom to the fish bite and a state of winding-up after the fish bite or the like (hereinafter, collectively referred to as a fishing state) can be widely detected, recorded, and reproduced, attention and interest in fishing can be significantly increased. However, such recording and reproduction of the fishing state have not been performed yet including the mode according to Patent Literature 1.

The present disclosure has been made in view of the above circumstances, and an object thereof is to provide a fishing state management device capable of detecting, recording, and reproducing a fishing state as described above, a fishing rod comprising the same, and a fishing state management system comprising the same. Purposes of the present disclosure other than this object will be clarified by referring to the overall description disclosed herein.

Solution to Problem

A fishing state management device according to an embodiment of the present disclosure is a fishing state management device that comprises a grip portion and is provided on a fishing rod to which a fishing line having a fishing hook is attached at an end, and comprises: a vibration generation unit that is provided on the grip portion and generates vibration in the grip portion; a detection unit that is provided on the fishing rod and detects a fishing state including at least movement and vibration of the fishing rod to generate data regarding the fishing state; a recording unit that records the data regarding the fishing state; and a processing unit that transmits a vibration generation signal to the vibration generation unit based on the data regarding the fishing state.

The fishing state management device according to the embodiment of the present disclosure comprises a transmission/reception unit, and is configured such that the transmission/reception unit receives data regarding a fishing state of another user from the outside, the information processing unit transmits a vibration generation signal to the vibration generation unit based on this data regarding the fishing state, and the vibration generation unit generates vibration in the grip portion.

In the fishing state management device according to the embodiment of the present disclosure, the recording unit is configured to recorded data regarding a fishing state for each fishing action as history data.

In the fishing state management device according to the embodiment of the present disclosure, the recording unit is configured to recorded data of another user regarding a fishing state for each fishing action as history data.

The fishing state management device according to the embodiment of the present disclosure is configured such that the fishing state comprises at least vibration of the fishing rod and acceleration of the fishing rod.

The fishing state management device according to the embodiment of the present disclosure is configured such that the fishing state further comprises tension of the fishing line and a discharge line length of the fishing line.

The fishing state management device according to the embodiment of the present disclosure comprises a display unit, and the display unit is configured to display the fishing state.

In the fishing state management device according to the embodiment of the present disclosure, the vibration generation unit comprises an actuator unit that vibrates the grip portion and is configured to drive the actuator unit based on the vibration generation signal from the processing unit.

A fishing state management system according to an embodiment of the present disclosure is a fishing state management system comprising: a fishing rod; an information processing device; and a fishing state management device that is communicably connected to the information processing device, comprises a grip portion, and is provided on a fishing rod to which a fishing line having a fishing hook is attached at an end, and is configured such that the information processing device comprises a recording unit that records data regarding the fishing state including at least movement and vibration of the fishing rod, the fishing state management device comprises: a vibration generation unit that is provided on the grip portion and generates vibration in the grip portion; a detection unit that is provided on the fishing rod and detects the fishing state to generate the data regarding the fishing state; and a processing unit that transmits a vibration generation signal to the vibration generation unit based on the data regarding the fishing state, and the data regarding the fishing state detected by the detection unit is stored in the recording unit, and the processing unit transmits the vibration generation signal to the vibration generation unit based on the data regarding the fishing state stored in the recording unit.

In the fishing state management system according to the embodiment of the present disclosure, the information processing device comprises a display unit, and the display unit is configured to display the data regarding the fishing state stored in the recording unit.

In the fishing state management system according to the embodiment of the present disclosure, the fishing state management device comprises a display unit, and is configured to acquire the data regarding the fishing state from the information processing device and display the data regarding the fishing state on the display unit.

A fishing rod according to an embodiment of the present disclosure comprises any one of the above-described fishing state management device.

According to the above embodiments, it is possible to provide the fishing state management device capable of detecting, recording, and reproducing the fishing state, the fishing rod comprising the same, and the fishing state management system comprising the same.

DETAILED DESCRIPTION

Hereinafter, an embodiment of a fishing rod according to the present disclosure will be specifically described with reference to the accompanying drawings. Components common in a plurality of drawings are assigned with the same reference signs throughout the plurality of drawings. Note that the drawings are not necessarily drawn to scale for convenience of description.

Figure 1:
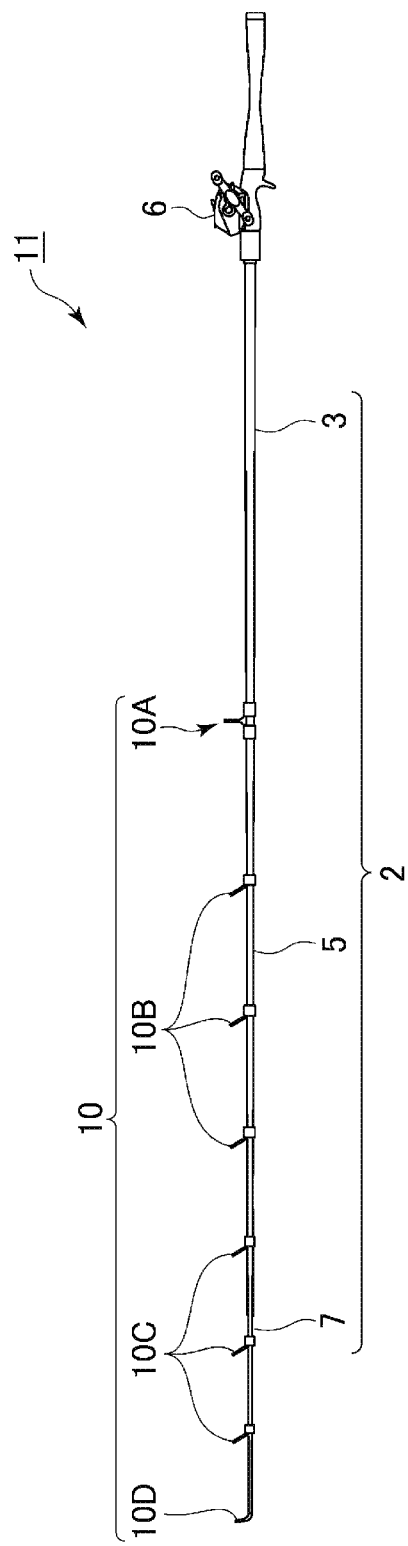
FIG. 1 is a view illustrating a fishing rod according to an embodiment of the present disclosure.

FIG. 1 is a view illustrating the fishing rod. As illustrated in the drawings, a fishing rod 11 comprises a rod body 2, a reel 6 attached to the rod body 2 via the fishing rod 11, and fishing line guides 10 attached to the rod body 2. In the illustrated embodiment, the fishing rod 11 and the fishing line guides 10 correspond to attachment components attached to an outer peripheral surface of the rod body.

The rod body 2 is constituted by, for example, connecting a base rod 3, a middle rod 5, a tip rod 7, and the like to each other. These rod bodies are joined to each other, for example, as an ordinarily jointed type. The base rod 3, the middle rod 5, and the tip rod 7 can be joined to each other as a telescopic type, an inversely jointed type, a socket-and-spigot jointed type, or any other known joining type. The rod body 2 may be formed by a single rod body.

The base rod 3, the middle rod 5, and the tip rod 7 are each formed by, for example, a tubular body made of a fiber-reinforced resin. This tubular body made of a fiber-reinforced resin is formed by winding a fiber-reinforced resin prepreg (prepreg sheet) in which reinforcing fibers are impregnated with a matrix resin around a core metal, and heating and curing the prepreg sheet. As the reinforcing fibers contained in the prepreg sheet, for example, carbon fibers, glass fibers, and any other known reinforcing fibers can be used. As the matrix resin contained in the prepreg sheet, a thermosetting resin such as an epoxy resin can be used. After the prepreg sheet is cured, the core metal is removed. Furthermore, an outer surface of the tubular body is appropriately polished. Each of the rod bodies may be formed in a solid state.

In the illustrated embodiment, the base rod 3, the middle rod 5, and the tip rod 7 comprises a plurality of fishing line guides 10 (fishing line guides 10A to 10D) for guiding a fishing line fed from the reel 6 attached to the fishing rod 11. More specifically, the base rod 3 comprises the fishing line guide 10A, the middle rod 5 comprises the fishing line guide 10B, and the tip rod 7 comprises the fishing line guide 10C. The tip rod 7 comprises the top guide 10D at a tip thereof, but details thereof are omitted.

Figure 2:
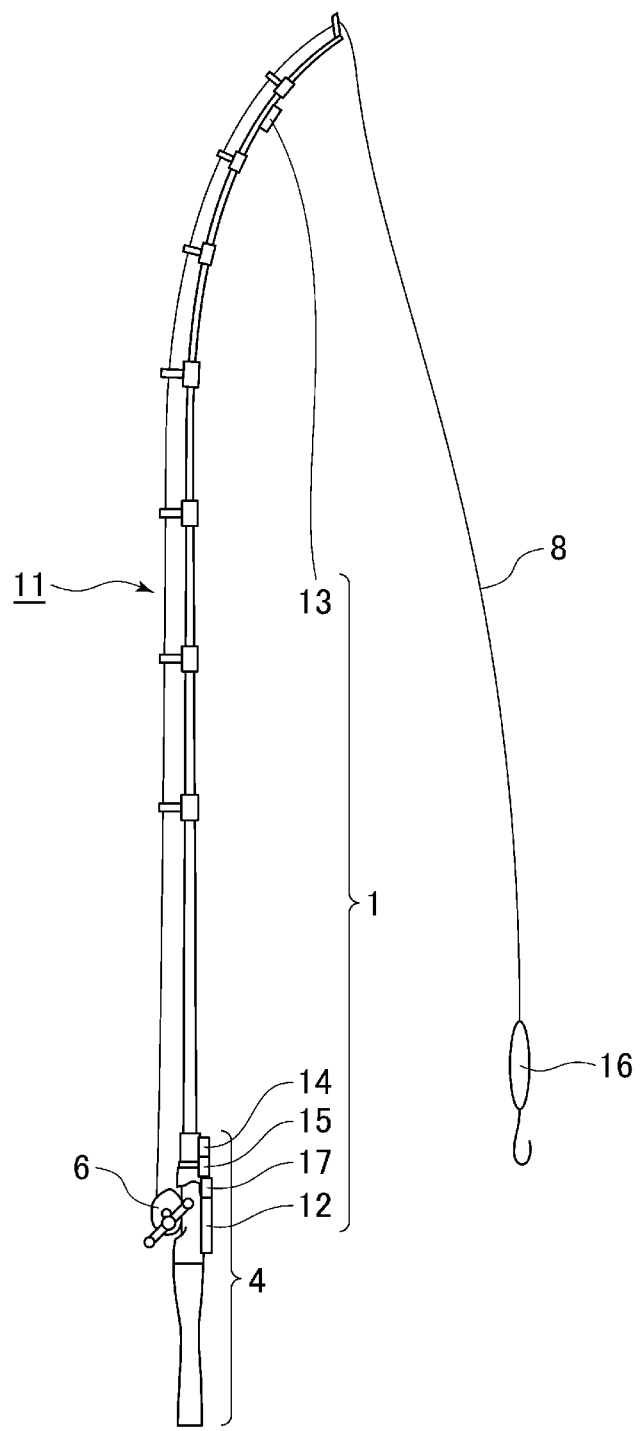
FIG. 2 is a view illustrating a fishing state management device according to an embodiment of the present disclosure.

Next, a fishing state management device according to an embodiment of the present disclosure is described with reference to FIG. 2. As illustrated in the drawing, a fishing state management device 1 according to the embodiment of the present disclosure is the fishing state management device 1 that comprises a grip portion 4 and is provided on a fishing rod 11 to which a fishing line 8 having a fishing hook 16 is attached at an end, and comprises: a vibration generation unit 12 that is provided on the grip portion 4 and generates vibration in the grip portion 4; a detection unit 13 that is provided on the fishing rod 11 and detects a fishing state including at least movement and vibration of the fishing rod 11 to generate data regarding the fishing state; a recording unit 14 that records the data regarding the fishing state; and a processing unit 15 that transmits a vibration generation signal to the vibration generation unit based on the data regarding the fishing state.

With the fishing state management device according to the embodiment of the present disclosure, it is possible to provide the fishing state management device capable of detecting, recording, and reproducing the fishing state. As a result, a fishing person can reproduce states of the fishing line, the fishing hook, and the like before a fish bite and states of the fishing line, the fishing hook, and the like after the fish bite (information such as vibration felt at the hand of the fishing rod) by the grip portion of the fishing rod, which can lead to improvement of skill of the fishing person, improvement of a fishing result, and improvement of interest in fishing.

Here, as the detection unit 13, a piezoelectric element, a strain gauge, or a strain detection element can be used, but the present disclosure is not limited thereto. The movement and vibration of the fishing rod can be faithfully reproduced by the vibration generation unit 12 based on the data regarding the fishing state detected by the detection unit 13. Furthermore, the movement and vibration of the fishing rod may be amplified and generated by the vibration generation unit 12. Alternatively, the movement and vibration of the fishing rod may be generated by adjusting the transmission strength in the vibration generation unit 12. Note that in addition to the fishing hook 16, a lure, a fish-luring member (for example, a chum basket, a fish-luring plate, or the like), and the like can be attached to the fishing line 8 (not limited thereto), and these are collectively referred to as a fishing hook and the like.

Here, in the case of the fishing rod 11 to which the fishing line having the fishing hook 16 is attached at the end, the end thereof may not be an end in a strict sense depending on the type of fishing tackle. For example, the end of the fishing line may be provided with a fishing tackle, a lure, or other members, and these may be provided with the fishing hook 16, or various modes are conceivable in which the fishing line itself comprises a plurality of fishing lines and another intermediate member is attached to a plurality of the fishing lines and between a plurality of the fishing lines. From the above, in a case where there may be a configuration made by one fishing line, a plurality of the fishing lines, or a plurality of the fishing lines and the intermediate member provided between a plurality of the fishing lines, and the fishing hook is provided at the end of the fishing line, it should be understood that it means that the fishing hook is provided at the end of the fishing line directly or via the intermediate member (fishing tackle, the lure, or the like is assumed, but the present disclosure is not limited thereto).

The fishing state management device 1 according to the embodiment of the present disclosure comprises a transmission/reception unit 17, and is configured such that the transmission/reception unit 17 receives data regarding a fishing state of another user from the outside, the information processing unit 15 transmits a vibration generation signal to the vibration generation unit 12 based on this data regarding the fishing state, and the vibration generation unit 12 generates vibration in the grip portion 4. Here, the vibration generation unit 12 can be configured as a part of the grip portion 4 such that generating the vibration in the grip portion 4 includes vibrating of the vibration generation unit 12 itself (the same applies throughout the present specification). Here, it is assumed that the fishing state of another user includes a fishing state related to another fishing rod of the same user. Here, examples of the outside include an external information communication terminal (for example, a smartphone or the like), an information processing device, and an information processing system, but are not limited thereto.

With the fishing state management device according to the embodiment of the present disclosure, it is possible to provide the fishing state management device capable of acquiring and reproducing the fishing state of another user. As a result, the fishing person can reproduce states of the fishing line, the fishing hook, and the like before a fish bite and states of the fishing line, the fishing hook, and the like after the fish bite (information such as vibration felt at the hand of the fishing rod) of the another user by the grip portion of the fishing rod, and thus, can perform learning from the another user, which can lead to improvement of skill of the fishing person, improvement of a fishing result, and improvement of interest in fishing.

Furthermore, in the fishing state management device 1 according to the embodiment of the present disclosure, the recording unit 14 is configured to recorded data regarding a fishing state for each fishing action as history data. As a result, an operator can hold past fishing states of the same operator as the history data, and thus, the data can be used when display, reproduction, or the like is performed.

Furthermore, in the fishing state management device 1 according to the embodiment of the present disclosure, the recording unit 14 is configured to recorded data of another user regarding a fishing state for each fishing action as history data. As a result, the operator can hold past fishing states of the another user as the history data, and thus, the data can be used when display, reproduction, or the like is performed.

The fishing state management device 1 according to the embodiment of the present disclosure is configured such that the fishing state comprises at least vibration of the fishing rod and acceleration of the fishing rod.

Furthermore, the fishing state management device 1 according to the embodiment of the present disclosure is configured such that the fishing state further comprises tension of the fishing line and a discharge line length of the fishing line. Furthermore, air volume, temperature, sunshine, vibration of a fishing area (location point) such as a ship/lighter, and the like may also be included, but the present disclosure is not limited thereto.

The fishing state management device 1 according to the embodiment of the present disclosure comprises a display unit (not illustrated), and the display unit is configured to display the fishing state.

In the fishing state management device 1 according to the embodiment of the present disclosure, the vibration generation unit 12 comprises an actuator unit that vibrates the grip portion 4 and drives the actuator unit based on the vibration generation signal from the processing unit 15. Here, furthermore, in the fishing state management device according to the embodiment of the present disclosure, the actuator unit is configured to be a plate-shaped actuator. The reason why the plate-shaped actuator is desirable is that, first, the vibration waveform of the vibration generation unit 12 is optimal for assimilating with the real sense of fishing of the fishing person (a deformation form of the plate is the same as a deformation form of the fishing rod, and it is felt that the deformation and vibration of the tip are at hand), and then, vibration of, for example, a low frequency (1 Hz or higher) can also be felt by physical deformation.

Figure 3:
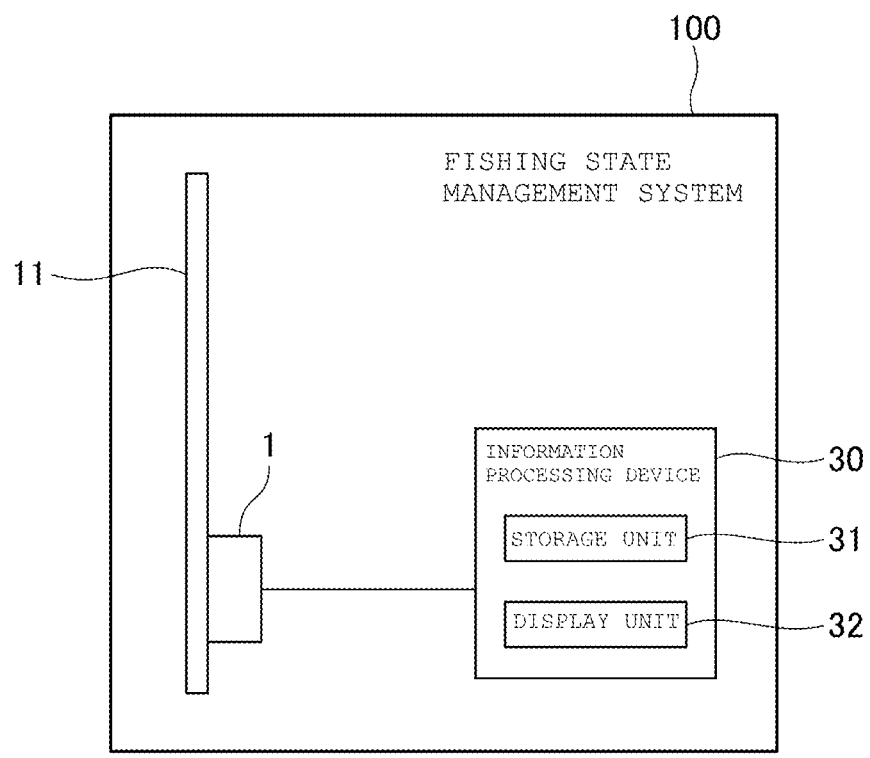
FIG. 3 is a view illustrating a fishing state management system according to an embodiment of the present disclosure.

Next, a fishing state management system 100 according to an embodiment of the present disclosure will be described with reference to FIG. 3 and a part of FIG. 2. As illustrated in the drawing, the fishing state management system 100 according to the embodiment of the present disclosure is the fishing state management system 100 comprising: a fishing rod 11; an information processing device 30; and a fishing state management device 1 that is communicably connected to the information processing device 30, comprises a grip portion 4, and is provided on a fishing rod 11 to which a fishing line 8 having a fishing hook 16 is attached at an end, and is configured such that the information processing device 30 comprises a recording unit 31 that records data regarding the fishing state comprising at least movement and vibration of the fishing rod 11, the fishing state management device 1 comprises: a vibration generation unit 12 that is provided on the grip portion 4 and generates vibration in the grip portion 4; a detection unit 13 that is provided on the fishing rod 11 and detects the fishing state to generate the data regarding the fishing state; and a processing unit 15 that transmits a vibration generation signal to the vibration generation unit based on the data regarding the fishing state, and the data regarding the fishing state detected by the detection unit 13 is stored in the recording unit 31, and the processing unit 15 transmits the vibration generation signal to the vibration generation unit 12 based on the data regarding the fishing state stored in the recording unit. Here, the term "communicably connected" refers to being connected wirelessly or by wire in a state where communication is possible.

According to the fishing state management system according to the embodiment of the present disclosure, it is possible to detect the fishing state, record the fishing state in the separate information processing device, and reproduce the vibration or the like felt at the hand of the fishing rod by the grip portion of the fishing rod by referring to the recorded information as necessary. As a result, pieces pf data regarding fishing states can be managed in a centralized manner by the information processing device, and when the data is acquired as necessary, a fishing person can reproduce states of the fishing line, the fishing hook, and the like before a fish bite and states of the fishing line, the fishing needle, and the like after the fish bite (information such as vibration felt at the hand of the fishing rod) by the grip portion of the fishing rod, and thus, which can lead to improvement of skill of the fishing person, improvement of a fishing result, and improvement of interest in fishing. Here, as the information processing device, a computer, a smartphone, a game player, or a cloud system is conceivable, but the present disclosure is not limited thereto.

In the fishing state management system 100 according to an embodiment of the present disclosure, the information processing device 30 comprises a display unit 32, and the display unit 32 is configured to display the data regarding the fishing state stored in the recording unit 31. In this manner, the fishing state can be managed by the information processing device 30.

In the fishing state management system 100 according to the embodiment of the present disclosure, the fishing state management device 1 comprises a display unit (not illustrated), and is configured to acquire the data regarding the fishing state from the information processing device 30 and display the data regarding the fishing state on the display unit. In this manner, the fishing state can be managed by the fishing state management device 1.

Furthermore, the fishing rod 11 according to the embodiment of the present disclosure is configured to comprise any one of the above-described fishing state management devices 1.

Figure 4:
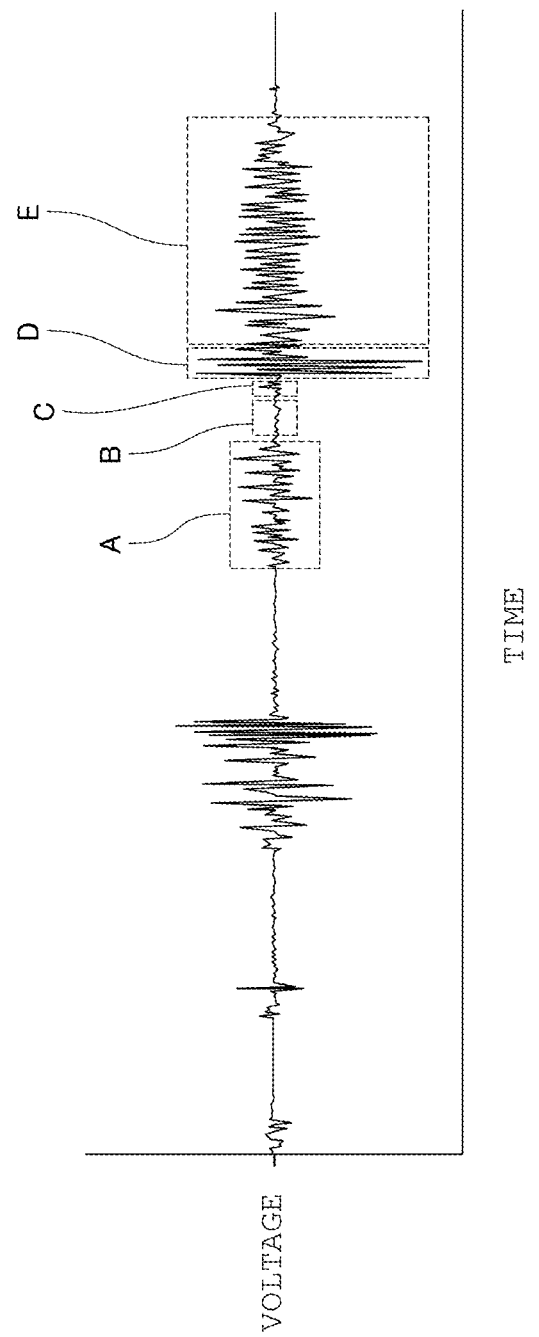
FIG. 4 is a view illustrating data regarding a fishing state and a reproduction method in the fishing state management device according to the embodiment of the present disclosure.

Next, data regarding a fishing state in the fishing state management device 1 according to the embodiment of the present disclosure will be described with reference to FIG. 4. In FIG. 4, the horizontal axis represents time, and the vertical axis represents a voltage. In the illustrated example, the detection unit 13 detects the movement and vibration of the fishing rod until a filefish is caught after the start of fishing using the filefish as an example.

For example, in the fishing state management device 1 according to the embodiment of the present disclosure, when the detection unit 13 detects Data A regarding a fishing state illustrated in the drawing, it is determined from the nature of the waveform that the luring operation with the fishing rod is being performed, and thus, the vibration generation unit generates first vibration indicating that the luring operation with the fishing rod is being performed.

Furthermore, for example, in the fishing state management device 1 according to the embodiment of the present disclosure, when the detection unit 13 detects Data B regarding a fishing state illustrated in the drawing, it is determined from the nature of the waveform that the fish is approaching the fishing hook (referred to as a pre-fish bite), and thus, the vibration generation unit generates second vibration indicating that the fish is approaching the fishing hook.

Next, for example, in the fishing state management device 1 according to the embodiment of the present disclosure, when the detection unit 13 detects Data C regarding a fishing state illustrated in the drawing, it is determined from the nature of the waveform that C indicate the fish bite to the fishing hook, and thus, the vibration generation unit generates third vibration indicating the fish bite to the fishing hook.

Furthermore, for example, in the fishing state management device 1 according to the embodiment of the present disclosure, when the detection unit 13 detects Data D regarding a fishing state illustrated in the drawing, it is determined from the nature of the waveform that the fishing line is aligned and is being wound up, and thus, the vibration generation unit generates fourth vibration indicating that the fishing line is aligned and is being wound up.

Next, for example, in the fishing state management device 1 according to the embodiment of the present disclosure, when the detection unit 13 detects Data E regarding a fishing state illustrated in the drawing, it is determined from the nature of the waveform that the fishing line is being wound up, and thus, the vibration generation unit generates fifth vibration indicating that the fishing line is being wound up.

Figure 5:
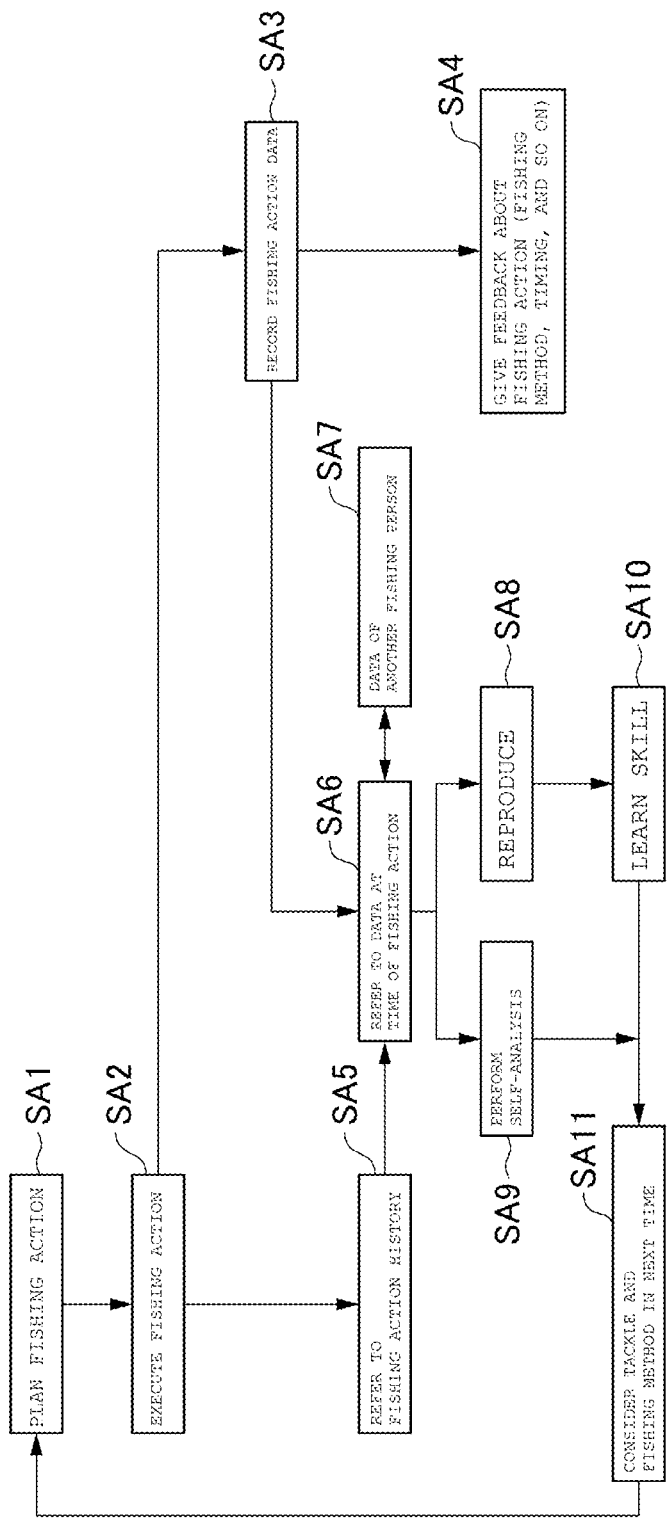
FIG. 5 is a view illustrating an example of the entire use procedure including a management method in a fishing state management device 1 or a fishing state management system 100 according to the embodiment of the present disclosure.

Next, an example of the entire use procedure including a management method in the fishing state management device 1 or the fishing state management system 100 according to the embodiment of the present disclosure will be described with reference to FIG. 5. As illustrated in the drawing, first, a fishing action is planned (SA1). Thereafter, the fishing action is executed (SA2). During fishing, fishing action data (data regarding a fishing state) is recorded (SA3). Feedback about the fishing action is given (SA4).

Next, when the execution of the fishing action (SA2) ends, it is possible to refer to a history of immediately previous or previous fishing action data (data regarding the fishing state) related to a user himself/herself or the user himself/herself and another user (SA5). At that time, it is possible to refer to the fishing action data (data regarding the fishing state) recorded for each fishing action of the user (SA6). Furthermore, data of another fishing person (user) regarding the fishing state can be acquired as necessary (SA7).

Thereafter, states of the fishing line, the fishing hook, and the like before a fish bite and states of the fishing line, the fishing hook, and the like after the fish bite (information such as vibration felt at the hand of the fishing rod) can be reproduced by the grip portion of the fishing rod based on such fishing action data (data regarding the fishing state) (SA8). Furthermore, self-analysis (for example, what kind of luring method was used?, what kind of pre-fish bite has occurred?, how was the fish bite? what kind of reaction (including the way of adjustment) was taken for the fish bite?, or how to struggle a caught fish) is performed using such fishing action data (data regarding the fishing state) (SA9).

Next, after the reproduction, the skill can be learned (SA10). Thereafter, tackle and a fishing method in the next fishing action are considered (SA11). In this manner, when the fishing state management device 1 or the fishing state management system 100 according to the embodiment of the present disclosure is used, a fishing person can reproduce states of the fishing line, the fishing hook, and the like before a fish bite and states of the fishing line, the fishing hook, and the like after the fish bite (information such as vibration felt at the hand of the fishing rod) of the fishing person himself/ herself another user by the grip portion of the fishing rod, and thus, can perform learning for himself/herself from the another user, which can lead to improvement of skill of the fishing person, improvement of a fishing result, and improvement of interest in fishing.

Figure 6:
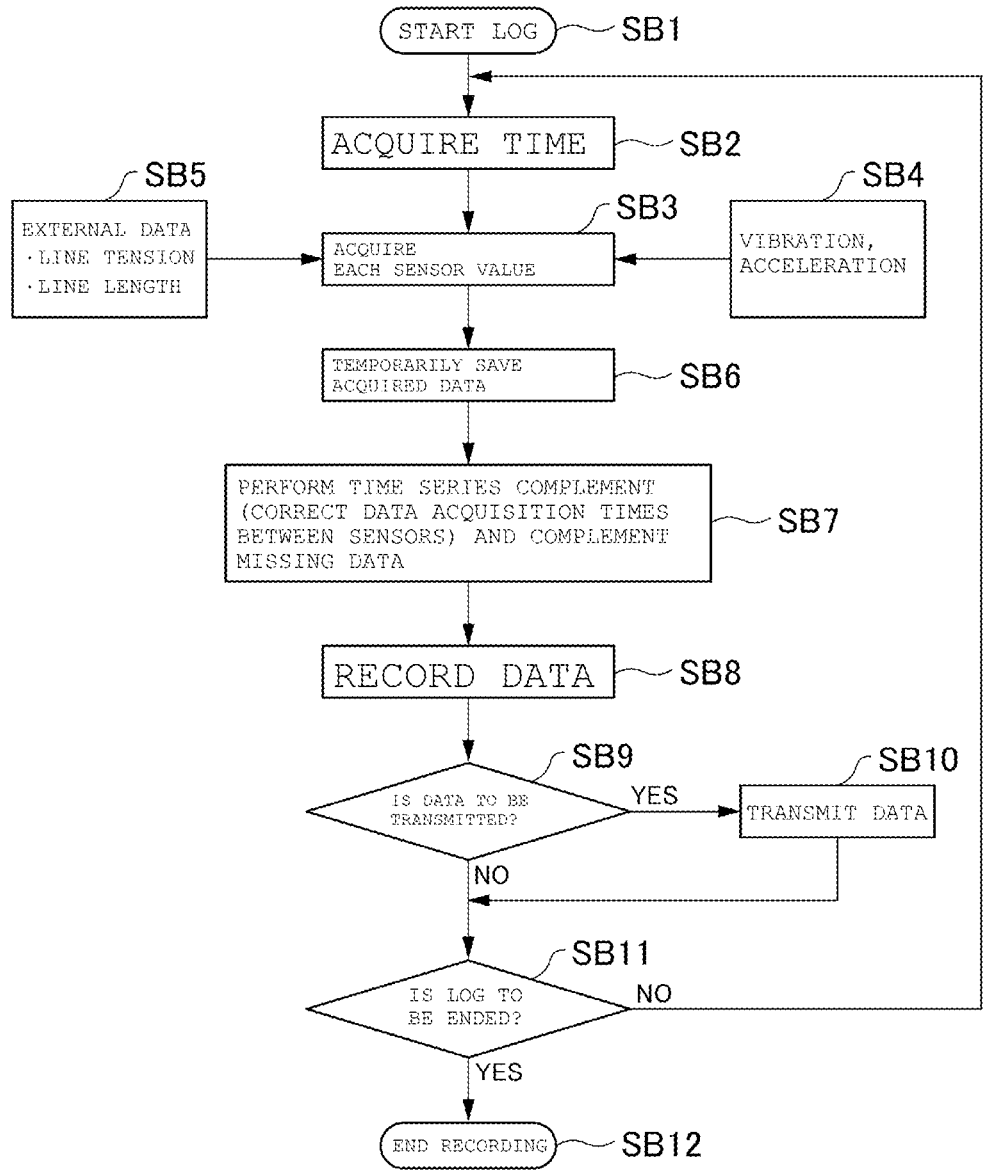
FIG. 6 is a view illustrating a data recording method in the fishing state management device 1 or the fishing state management system 100 according to the embodiment of the present disclosure.

Next, an example of a data recording method in the fishing state management device 1 or the fishing state management system 100 according to the embodiment of the present disclosure will be described with reference to FIG. 6. As illustrated in the drawing, first, recording of data regarding a fishing state is started at the time of execution of a fishing action (SB1). Then, time is acquired (SB2). Thereafter, detection of vibration, acceleration, and the like of the fishing rod is performed (SB4), and detection of tension, a line length, and the like of the fishing line is performed outside the fishing state management device 1 (SB5), thereby acquiring detection values (sensor values) of these (SB3). Then, the acquired detection values (sensor values) are primarily stored (SB6).

Next, processing of arranging the acquired detection values (sensor values) in time series is performed, that is, time-series complement of the acquired detection values (sensor values) is performed (SB7). Missing data is complemented as necessary. Thereafter, these pieces of data are recorded as data regarding the fishing state (SB8). Next, it is determined whether to transmit the data (SB9), and the data is transmitted if necessary (SB10), and it is determined whether to end recording the data regarding the fishing state (SB11). On the other hand, in a case where it is not necessary to transmit the data, it is determined whether to end the recording of the data regarding the fishing state (SB11). In a case where the recording of the data regarding the fishing state is to be ended, the data recording is ended (SB12). In a case where the recording of the data regarding the fishing state is not to be ended, the processing returns to the acquisition of time (SB2) described above.

Figure 7:
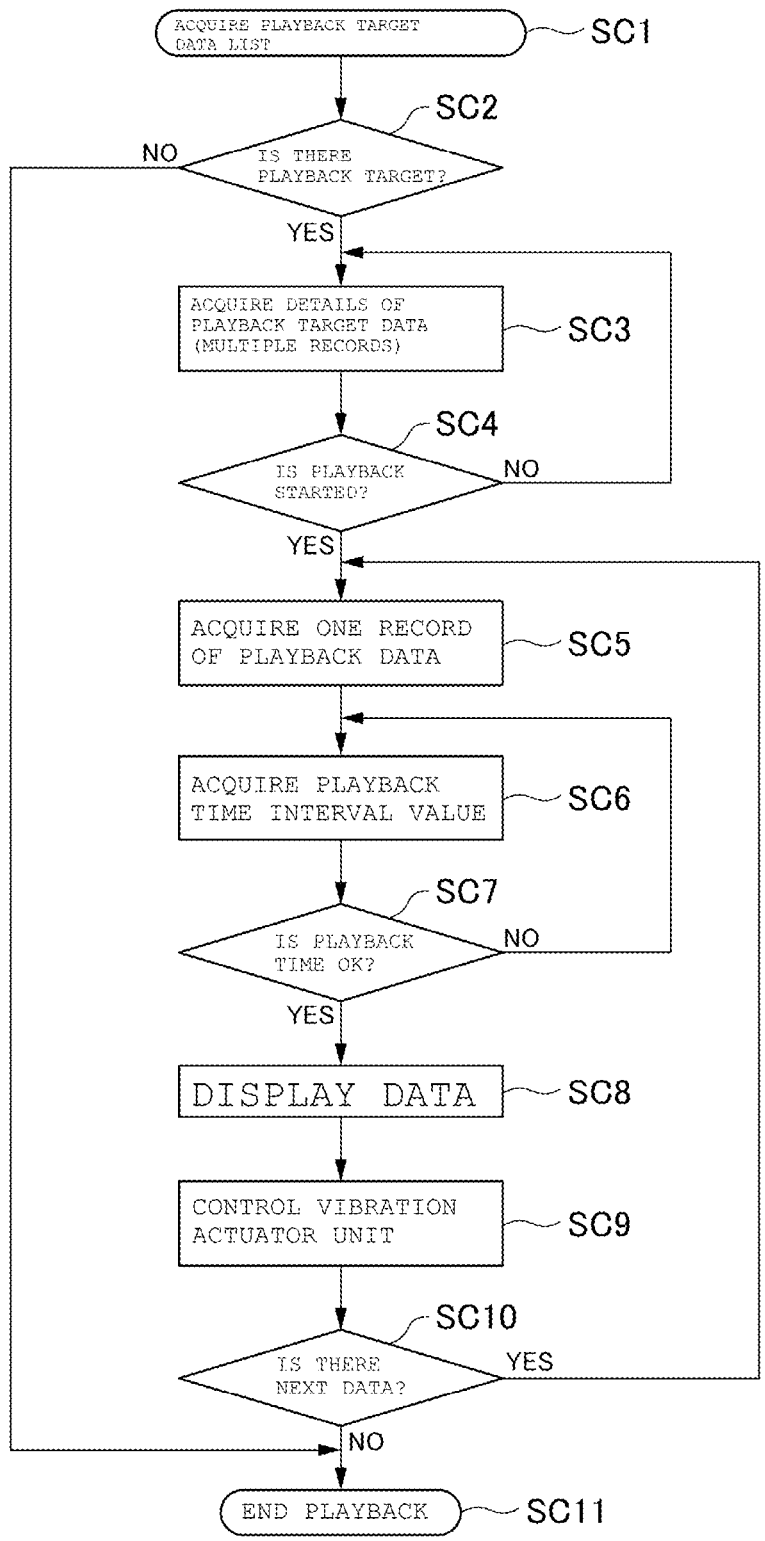
FIG. 7 is a view illustrating an example of a procedure of reproducing (playing back) recorded data in the fishing state management device 1 or the fishing state management system 100 according to the embodiment of the present disclosure.

Next, an example of a procedure of reproducing (playing back) recorded data in the fishing state management device 1 or the fishing state management system 100 according to the embodiment of the present disclosure will be described with reference to FIG. 7. Here, it is assumed that reproducing (playing back) recorded data indicates reproducing (playing back) vibration of the rod between casting of the fishing tackle (start of the fishing operation) to retrieval of the fishing tackle (end of the fishing operation) including struggling with the fish at the time of fishing (the same applies throughout the present specification). As illustrated in the drawing, first, recorded data (playback target data list) regarding a fishing state to be reproduced is acquired (SC1). Then, it is determined whether there is playback target data (SC2). When there is no recorded data (playback target data list) regarding a fishing state, the reproduction (playback) of recorded data is ended (SC11).

When there is recorded data (playback target data list) regarding the fishing state, detailed information of the recorded data is acquired (SC3). Next, it is determined whether to reproduce (play back) the recorded data (playback target data list) (SC4). When the recorded data (playback target data list) regarding the fishing state is not reproduced (played back), the processing returns to the acquisition of the detailed information (SC3). When the recorded data (playback target data list) regarding the fishing state is reproduced (played back), data (record) for one playback of the recorded data (playback target data list) regarding the fishing state is acquired (SC5). Next, a reproduction (playback) time interval value is acquired (SC6).

Then, it is determined whether there is no problem in a reproduction (playback) time of the data (record) for one playback of the recorded data (playback target data list) regarding the fishing state (SC7). When there is a problem in the reproduction (playback) time of the data (record) for one reproduction of the recorded data (playback target data list) regarding the fishing state, the processing returns to the acquisition of the data (record) for one playback of the recorded data (playback target data list) regarding the fishing state (SC5). When there is no problem in the reproduction (playback) time of the data (record) for one playback of the recorded data (playback target data list) regarding the fishing state, the data is displayed (SC8). Here, the display of data indicates a vibration waveform. Next, the vibration generation unit (vibration actuator) is controlled to perform reproduction (playback) (SC9). Then, it is determined whether there is the next data (SC10), and if there is no next data, the reproduction (playback) is ended (SC11). When there is the next data, the processing returns to the acquisition of data (record) for one playback of the recorded data (playback target data list) regarding the fishing state (SC5).

Figure 8:
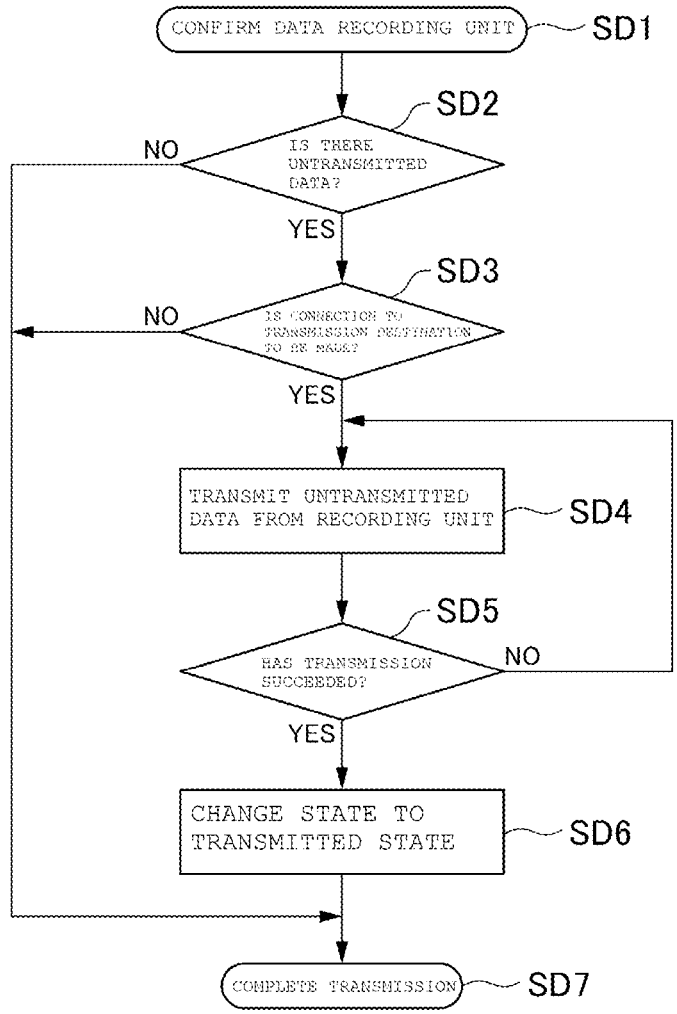
FIG. 8 is a view illustrating an example of a data transmission method in the fishing state management device 1 or the fishing state management system 100 according to the embodiment of the present disclosure.

Next, an example of a data transmission method in the fishing state management device 1 or the fishing state management system 100 according to the embodiment of the present disclosure will be described with reference to FIG. 8. As illustrated, first, a state of the recording unit (data recording unit) is confirmed (SD1). Then, it is determined whether there is untransmitted data (SD2). When there is no untransmitted data, data transmission is completed (SD7).

When there is untransmitted data, it is determined whether to make a connection to a transmission destination (SD3). When no connection is made to the transmission destination, the data transmission is completed (SD7). On the other hand, when the connection to the transmission destination is made, the untransmitted data is transmitted from the recording unit (SD4). Then, it is determined whether the transmission of the untransmitted data has succeeded (SD5). When the transmission of the untransmitted data is interrupted completed for some reason, the processing returns to the transmission of the untransmitted data from the recording unit (SD4). When the transmission of the untransmitted data has succeeded, a state of the data is set to a transmitted state (SD6), and the transmission is completed (SD7).

Dimensions, materials, and arrangements of the components described in this specification are not limited to those explicitly described in the embodiments, and the components may be modified to have any dimensions, materials, and arrangements that may fall within the scope of the present disclosure. Furthermore, components not explicitly described herein can be added to the described embodiments, or some of the components described in each of the embodiments can be removed.

REFERENCE SIGNS LIST

1 Fishing state management device
2 Rod body
3 Base rod
4 Grip portion
5 Middle rod
6 Reel
7 Tip rod
8 Fishing line
10 Fishing line guide
11 Fishing rod
12 Vibration generation unit
13 First detection unit
14 Recording unit
15 Processing unit
16 Fishing hook
17 Transmission/reception unit
30 Information processing device
31 Recording unit
32 Display unit
100 Fishing state management system

The invention claimed is:

1. A fishing state management device that comprises a grip portion and is provided on a fishing rod of a user to which a fishing line having a fishing hook is attached at an end, the fishing state management device further comprising:
a vibration generation unit that is provided on the grip portion and generates vibration in the grip portion;
a detection unit that is provided on the fishing rod and detects a fishing state of the user comprising at least movement and vibration of the fishing rod to generate data regarding the detected fishing state;
a recording unit that records the data regarding the detected fishing state;
a processing unit that transmits a vibration generation signal to the vibration generation unit based on the data regarding the detected fishing state; and
a transmission/reception unit that receives data regarding a fishing state of another user from an outside,
wherein the processing unit transmits another vibration signal to the vibration generation unit that is generated based on the data regarding the fishing state of the another user, and
based on the another vibration signal, the vibration generation unit generates vibration in the grip portion that simulates vibration experienced by the another user based on the data regarding the fishing state of the another user.

2. The fishing state management device according to claim 1, wherein the recording unit records data regarding a detected fishing state for each fishing action as history data.

3. The fishing state management device according to claim 1, wherein the recording unit records data of the another user regarding a fishing state for each fishing action as history data.

4. The fishing state management device according to claim 1, wherein the detected fishing state comprises at least vibration of the fishing rod and acceleration of the fishing rod.

5. The fishing state management device according to claim 4, wherein the detected fishing state further comprises tension of the fishing line and a discharge line length of the fishing line.

6. The fishing state management device according to claim 1, further comprising a display unit, wherein the display unit displays the detected fishing state.

7. The fishing state management device according to claim 1, wherein the vibration generation unit comprises an actuator unit that vibrates the grip portion, and drives the actuator unit based on the vibration generation signal from the processing unit.

8. A fishing rod comprising the fishing state management device according to claim 1.

9. A fishing state management system comprising:
a fishing rod of a user;
an information processing device comprising a recording unit; and
a fishing state management device that is communicably connected to the information processing device, comprises a grip portion and is provided on a fishing rod to which a fishing line having a fishing hook is attached at an end,
the fishing state management device further comprising:
a vibration generation unit that is provided on the grip portion and generates vibration in the grip portion;
a detection unit that is provided on the fishing rod and detects a fishing state of the user comprising at least movement and vibration of the fishing rod, and generates data regarding the detected fishing state, which is then stored in the recording unit;

a processing unit that transmits a vibration generation signal to the vibration generation unit based on the data regarding the detected fishing state stored in the recording unit; and a transmission/reception unit that receives data regarding a fishing state of another user from an outside, which is then stored in the recording unit, wherein the processing unit transmits another vibration signal to the vibration generation unit that is generated based on the data regarding the fishing state of the another user stored in the recording unit, and based on the another vibration signal, the vibration generation unit generates vibration in the grip portion that simulates vibration experienced by the another user based on the data regarding the fishing state of the another user.

10. The fishing state management system according to claim 9, wherein the information processing device comprises a display unit, and the display unit displays the data regarding the detected fishing state stored in the recording unit.

11. The fishing state management system according to claim 9, wherein the fishing state management device comprises a display unit, acquires the data regarding the detected fishing state from the information processing device, and displays the data regarding the detected fishing state on the display unit.

* * * * *